United States Patent

Hinson, II

[11] Patent Number: 5,830,306
[45] Date of Patent: Nov. 3, 1998

[54] METHOD AND KIT FOR ACCESSING OPTICAL FIBERS IN AN OPTICAL FIBER RIBBON

[75] Inventor: Alfred L. Hinson, II, Hickory, N.C.

[73] Assignee: Alcatel NA Cable Systems, Inc., Claremont, N.C.

[21] Appl. No.: 731,608

[22] Filed: Oct. 16, 1996

[51] Int. Cl.⁶ ............................ B32B 31/14; B32B 35/00
[52] U.S. Cl. ..................... 156/248; 156/247; 156/344; 156/584
[58] Field of Search .................... 156/247, 249, 156/344, 584, 248; 29/564.4; 81/9.4

[56] References Cited

U.S. PATENT DOCUMENTS

| | | | |
|---|---|---|---|
| 3,642,564 | 2/1972 | Walker et al. | 161/145 |
| 3,853,576 | 12/1974 | Netznik | 117/5.5 |
| 3,871,935 | 3/1975 | Gloge et al. | 156/158 |
| 3,936,338 | 2/1976 | Gibson | 156/157 |
| 3,984,172 | 10/1976 | Miller | 350/96 B |
| 4,732,642 | 3/1988 | Ametani | 156/497 |
| 4,865,411 | 9/1989 | Darsey et al. | 350/96.21 |
| 5,006,190 | 4/1991 | Earle | 156/247 |
| 5,009,735 | 4/1991 | Ametani et al. | 156/241 |
| 5,098,459 | 3/1992 | Fukuma et al. | 65/4.21 |
| 5,277,730 | 1/1994 | Darsey et al. | 156/158 |
| 5,287,426 | 2/1994 | Shahid | 385/85 |
| 5,298,105 | 3/1994 | Dorsey | 156/584 |
| 5,460,682 | 10/1995 | Beasley et al. | 156/344 |
| 5,460,683 | 10/1995 | Beasley, Jr. et al. | 156/344 |
| 5,600,750 | 2/1997 | Beasley, Jr. et al. | 385/114 |
| 5,604,834 | 2/1997 | Beasley, Jr. et al. | 156/344 X |
| 5,643,393 | 7/1997 | Genovese et al. | 156/344 |
| 5,681,417 | 10/1997 | Jacobs | 156/344 |
| 5,685,945 | 11/1997 | Mock et al. | 156/584 |

FOREIGN PATENT DOCUMENTS

| | | |
|---|---|---|
| 279203 | 5/1987 | Japan . |
| 356609 | 3/1988 | Japan . |
| 200109 | 8/1988 | Japan . |
| 195603 | 12/1988 | Japan . |
| 294504 | 12/1988 | Japan . |
| 316804 | 12/1988 | Japan . |
| 2005005 | 1/1990 | Japan . |
| 153305 | 6/1990 | Japan . |
| 005005 | 11/1990 | Japan . |
| 310203 | 1/1991 | Japan . |
| 045287 | 2/1991 | Japan . |
| 3186806 | 8/1991 | Japan . |

*Primary Examiner*—Curtis Mayes
*Attorney, Agent, or Firm*—Ware, Fressola, Van Der Sluys & Adolphson LLP

[57] ABSTRACT

A method and kit for stripping resin skin from part of the length of an optical fiber ribbon, allowing access over that length to the optical fibers in the ribbon. The method is simple and the method and kit are environmentally friendly. A strong liquid adhesive, such as cyanoacrylate, is used, with a special panel made of one of either of two materials, neoprene or nitrile, especially suitable for bonding to the ribbon skin using a strong liquid adhesive. The special panel avoids two problems plaguing methods of the prior art: finding a flat clean work surface, and cleanup.

20 Claims, 3 Drawing Sheets

METHOD AND KIT FOR ACCESSING OPTICAL FIBERS IN AN OPTICAL FIBER RIBBON

TECHNICAL FIELD

The present invention pertains to the field of optical fiber ribbon, and more particularly to a method and corresponding kit, suitable for use in the field, for accessing the optical fibers from the ribbon at an intermediate point along the ribbon.

BACKGROUND OF THE INVENTION

An optical fiber ribbon is a collection of several small optical fibers side by side, all lying in a plane, covered by skin made of a synthetic resin. This flat, side-by-side arrangement allows packing many optical fibers in a small cross-sectional area.

Sometimes one of the optical fibers in a ribbon needs to be repaired while the other fibers in the ribbon continue to carry light signals. To repair a damaged optical fiber without disturbing the live fibers, the resin skin must be removed from the optical fibers allowing access to the one or more fibers that must be repaired. Another, more frequent reason for accessing individual fibers in a ribbon is to splice one fiber to connect it to a piece of terminal equipment, leaving the other fibers intact until the ribbon is laid to another piece of terminal equipment. There is therefore a need to be able to remove the skin from an optical fiber ribbon along a length of the ribbon not necessarily starting at an end of the ribbon.

Several methods have been developed of making midpoint entry into an optical fiber ribbon to access the individual fibers encapsulated by the ribbon skin. These methods include cutting or scraping the skin off the fibers, and even only partially cutting (scoring) the skin and then mechanically removing it from the fibers. All of these methods, it is found, are likely to cause damage to the optical fibers, and so are undesirable.

Another method involves shearing the skin in some fashion, such as bending, tearing, pinching, or fatiguing it to peel it away from the optical fibers. These methods mechanically disturb the fibers of the ribbon well beyond the region where access is required; this rearranging the fibers decreases the packing density, compared to what is possible with the fibers arranged in the ribbon as originally manufactured.

Another method uses a solvent to dissolve or weaken the skin material so that it falls away or is easily peeled away from the optical fibers. This method, however, tends to remove the coating of the optical fibers which is often color coded, and, in addition, often requires a little more patience than a worker in the field is inclined to demonstrate.

A last method uses adhesive tape and, optionally, a strong liquid adhesive. Here the section of the optical fiber ribbon bearing the optical fibers to be accessed is pressed onto an adhesive tape and then pulled off the tape, leaving behind at least some of the skin from the span of ribbon to be stripped. Sometimes a strong liquid adhesive, such as cyanoacrylate, is used with the tape. The strong liquid adhesive is applied at the point on the ribbon where entry is desired. That point on the ribbon is then pressed onto a surface adjacent the adhesive tape. Finally, the optical fiber ribbon is pulled up and away, the strong liquid adhesive ensuring that the skin will tear and at least some will remain behind, adhered to the tape.

In this method, the prior art teaches using double-sided tape and a separate thin panel on which the strong liquid adhesive is deposited and to which the ribbon at the desired point of entry is glued. This method suffers from at least two drawbacks. First, there must be in the immediate vicinity a substantially flat and dean surface onto which the double-sided adhesive tape can be adhered. Second, since the panel on which the strong liquid adhesive is deposited will have some thickness, there will be a length of ribbon not adhered to the double-sided tape between where the ribbon is glued and where it first adheres to the tape. So when the ribbon is pulled away from where it is glued there will be a slight jerk, tending to remove the ribbon from the tape without further removing the skin from the fibers. In addition, after removing the ribbon skin from the fibers, the double-sided tape must be removed from the surface it was pressed onto. This residue of tape and skin can be difficult to remove from the surface bearing the tape, making cleanup challenging.

In accessing fibers in ribbon mid-span, it is very important to take precaution against bending the ribbon too much. If the fibers are live, then overbending the ribbon can cause attenuation of the light signal, disrupting or garbling communication. Even if the fibers are not live, it is important not to overbend the ribbon because the stress it causes could fracture the ribbon or fatigue the ribbon matrix so that it fractures later, and moreover, imparts to the optical fibers in the ribbon needless bending stresses.

The present invention provides a fast, simple method-not requiring great manual dexterity or skill, and so is unlikely to damage the fibers, and allows access to a well-defined span of the ribbon. In the present invention, the length of ribbon not adhered to a surface is insignificant, so there is little tendency for the slight jerk that occurs when pulling the ribbon in prior art methods. Just as importantly, the method of the present invention is environmentally friendly; it leaves no residue that is not easily picked up and carried off for appropriate disposal. In addition, the present invention includes a precaution against overbending the ribbon, ensuring the full life of the ribbon and guarding against disrupting communication when fibers are accessed in a ribbon with live fibers.

SUMMARY OF THE INVENTION

The present invention is a method and corresponding kit that overcomes the deficiencies of the prior art, in particular the prior method using a double-sided tape, a strong liquid adhesive, and a plastic card, by calling for the use of a panel made of material especially suitable for removing the ribbon skin. The panel according to the present invention is a neoprene or nitrile material, not a plastic, and permits a strong liquid adhesive to adhere to it quickly and securely. The panel is elongated, with a pressure-sensitive adhesive (PSA) coating from one end to almost, but not quite, all the way to the other end. The PSA coating is itself covered by a thin silicone paper, which can be removed easily, without tearing, exposing the PSA coating.

To remove the skin from an optical fiber ribbon, first the silicone paper is removed, exposing the PSA coating. Then a strong liquid adhesive is deposited near the bare end of the panel, the end not coated with the pressure sensitive adhesive and silicone paper. The optical fiber ribbon is then oriented so that the desired point of entry-the starting point-is at the bare end of the panel, and the desired stopping point is in the direction of the rest of the panel, the part covered by the pressure-sensitive adhesive, now exposed.

Then the desired starting point on the ribbon is pressed on to the bead of strong liquid adhesive, and the ribbon is laid down on the elongated panel and pressed onto the pressure sensitive adhesive.

After about five seconds the strong liquid adhesive will have dried sufficiently. Then the ribbon overhanging the end of the panel where the strong liquid adhesive is deposited is gripped and pulled up and back toward the rest of the ribbon, in the direction toward the span with the skin to be removed.

In one embodiment of the present invention, while pulling back the ribbon, a rubber cylinder is used to prevent over-bending the ribbon. The cylinder, approximately 3" in diameter and approximately ½" long, is placed on top of the ribbon still resting on the neoprene or nitrile panel, at the end being pulled away from the panel. Pulling the ribbon back causes the cylinder to roll toward the other end of the panel, all the while preserving a 1.5" minimum band radius of the ribbon, which guards against fracturing the ribbon and disrupting communication if the any of the ribbon fibers are signal-bearing during the mid-span access.

This pulling will usually remove the skin only from one side of the ribbon. If the ribbon span being stripped is longer than the elongated panel, the ribbon can be picked up off the panel, both the part of the ribbon still partially grasping the fibers and the part of the ribbon that adhered to the pressure sensitive adhesive, and repositioned on the panel toward where the strong liquid adhesive was deposited, and pressed back onto the pressure-sensitive adhesive so that stripping can continue. There is no need to deposit more strong liquid adhesive on the panel, since the skin has already started tearing.

When the skin on one side of the optical fibers has been pulled away from the fibers, it is broken at both the starting and stopping points by bending it several times first one way and then the opposite way, and so separating it from the rest of the ribbon.

To complete the process, it is often true that the ribbon must be turned over and the same process repeated for the other side of the skin to completely free the optical fibers.

The foregoing and other objects, features and advantages of the invention will become apparent in light of the following detailed description of exemplary embodiment thereof, with reference to the accompanying figures.

DETAILED DESCRIPTION OF THE INVENTION

Figure 1:
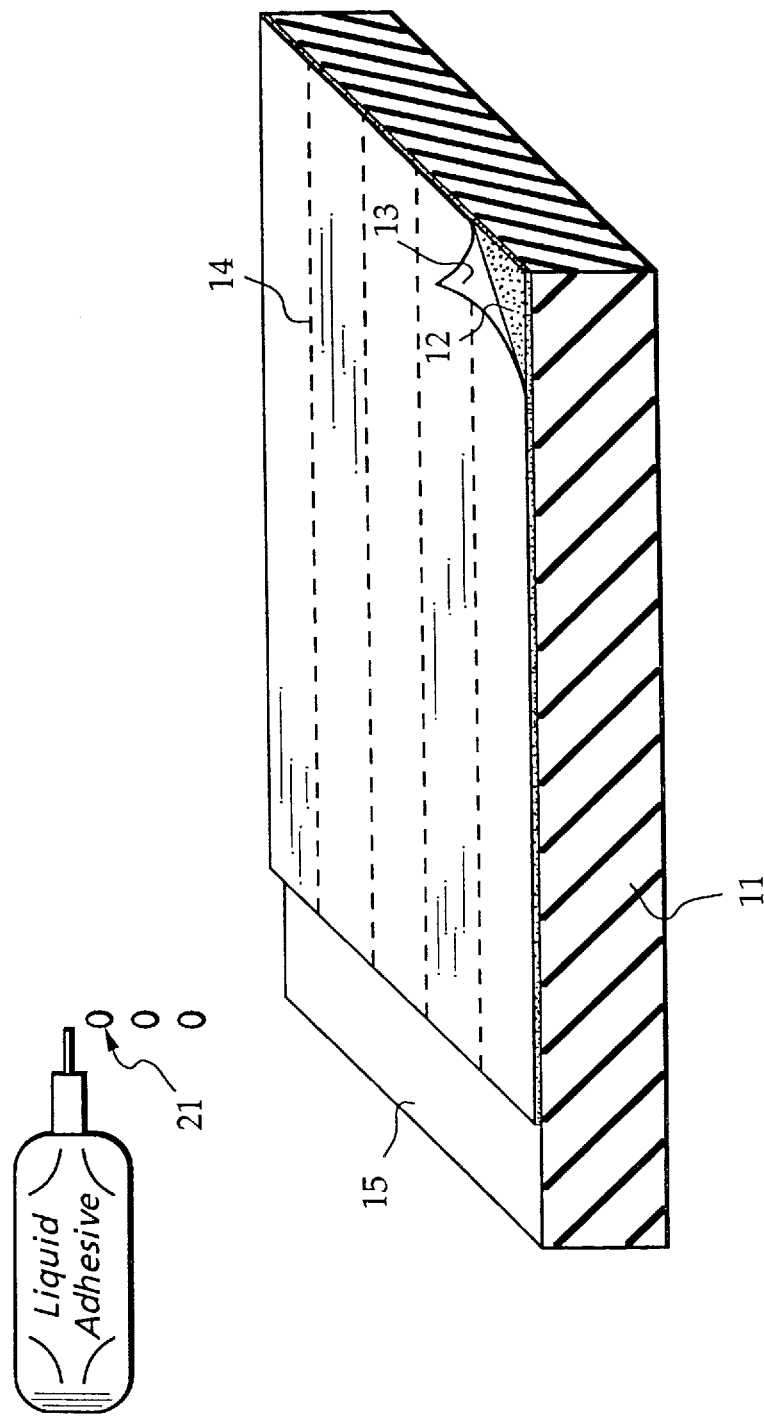
FIG. 1 is a perspective of the equipment used in the method of the present invention—panel and some strong liquid adhesive.

The present invention is a method and corresponding kit for removing the skin from an optical fiber ribbon over a span of the ribbon with at least one end of the span away from the end of the ribbon, allowing access to the optical fibers of the ribbon in that span. FIG. 1 shows the materials used in the present invention: a panel 11 of rubber, usually either neoprene or nitrile, of a thickness of preferably ¼ inch, and a length of usually approximately six inches. The ribbon to be mid-span accessed will be glued to the panel using a strong liquid adhesive, such as cyanoacrylate, and it is found that using a rubber material for the panel, especially either neoprene or nitrile, causes rapid curing of cyanoacrylate, compared to time for curing on a plastic material.

Most of the panel 11 is covered with a pressure sensitive adhesive coating 12. This coating 12 extends along the entire width of the panel 11 and along the length from one end to approximately ½ inch from the other end, leaving a bare surface 15 of the neoprene or nitrile panel 11. The pressure sensitive adhesive is covered everywhere by a thin piece of silicone paper 13. Besides this panel 11, the method uses a strong liquid adhesive, such as cyanoacrylate 21. One particularly useful adhesive is Loctite 495, manufactured by Loctite Corporation, Newington, Connecticut.

Figure 4:
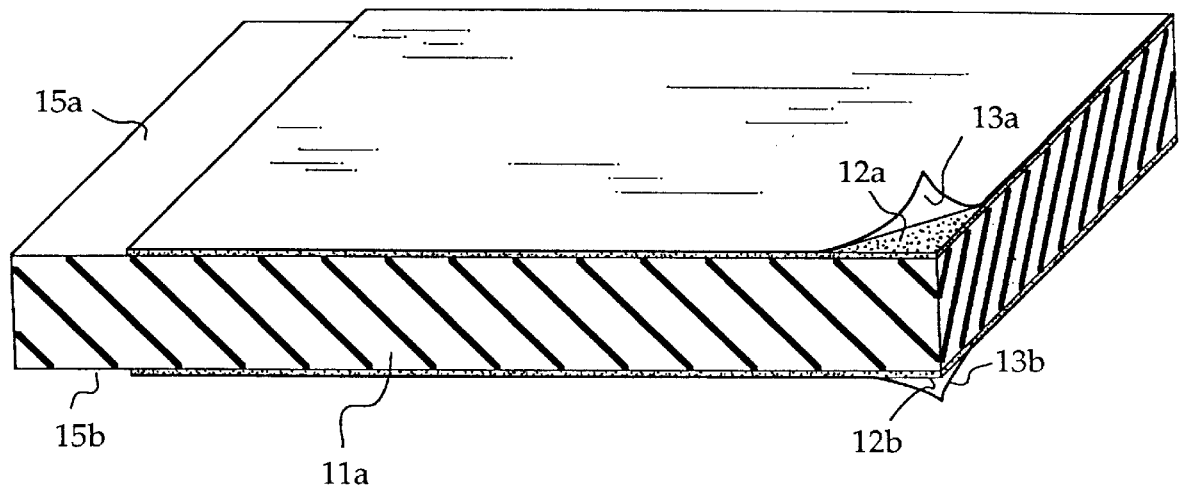
FIG. 4 is a perspective drawing of an embodiment in which both sides of a panel are designed to be used, both sides being covered by a pressure-sensitive adhesive except for a small area at one end.

In another embodiment, shown in FIG. 4, the panel 11a is covered on both of its broad sides with a pressure-sensitive adhesive 12a, 12b, except for the approximately ½ inch band 15a, 15b at one end. Both adhesive-coated surfaces are covered with silicone paper 13a, 13b. In this embodiment, after one side is used up, the panel 11a can be turned over and the other side used.

Figure 2:
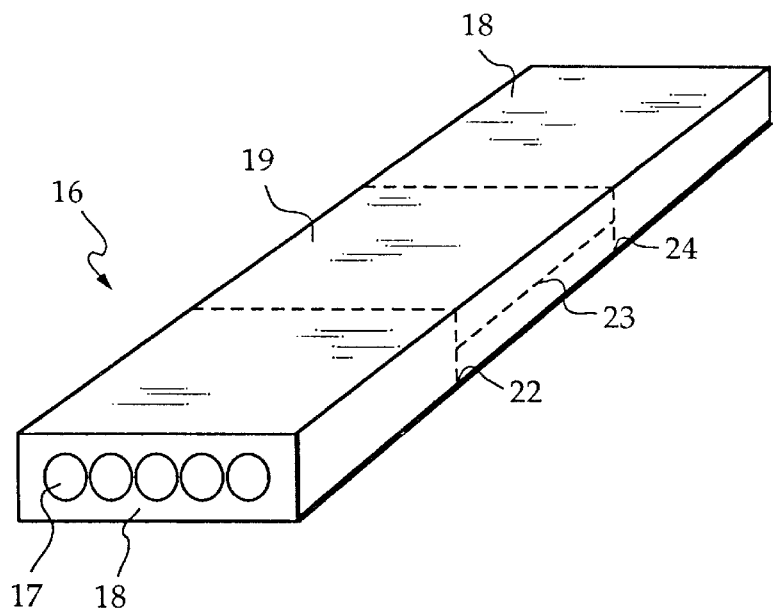
FIG. 2 is a perspective drawing of a span of optical fiber ribbon showing the skin surrounding individual optical fibers.

FIG. 2 shows a span of optical fiber ribbon 16 with optical fibers 17 encapsulated by a synthetic resin skin 18. The optical fibers 17 are in fact so densely packed in the ribbon 16 that there is essentially no space, and so no resin 18, between the fibers 17.

The method of the present invention relies on tearing the resin skin 18 on its two narrow sides along the length of the span where access to the optical fibers 17 is needed. In the span of optical ribbon shown in FIG. 2, a dashed line 23 indicates a tear line-where the skin 18 must be torn to access the optical fibers 17. FIG. 2 also shows a desired starting point 22 and a desired stopping point 24, the two points defining the tear line 23. There are corresponding desired starting and stopping points and a tear line on the opposite wall of the ribbon 16. The method of the present invention is used to remove, or strip, all of the resin skin 18 from the ribbon 16 between the starting 22 and stopping points 24. The span of resin skin to be removed is indicated as 19 in FIG. 2, and completely surrounds the optical fibers 17.

According to the present invention, to remove a span of resin skin 19 from an optical fiber ribbon, first a section of silicone paper 13 is peeled off the panel, exposing the pressure sensitive adhesive 12. In the embodiment shown in FIG. 1, the silicone paper 13 is perforated, with a line of perforations 14 which occurs about every ½ inch along the width of the panel, extending for the entire length of the panel and peeled off along a perforations 14. In another embodiment, the silicone paper is not perforated, but instead, is scored with a knife, razor, or other sharp tool, to help guide peeling off only what is needed.

Figure 3:
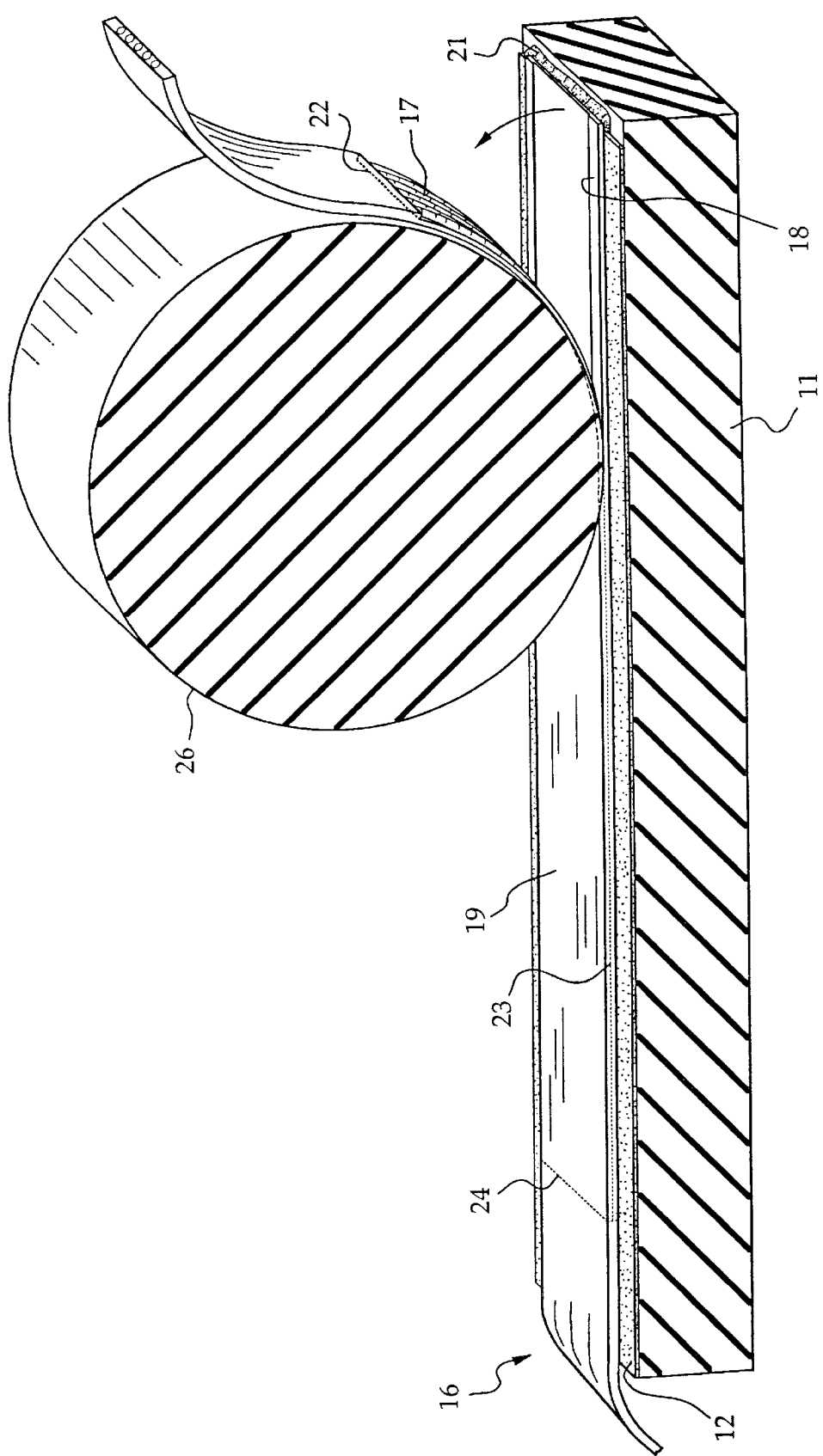
FIG. 3 is a perspective drawing of the method of the present invention during the process of stripping the ribbon skin from the optical fibers.

Referring to FIG. 3, a bead of strong liquid adhesive 21 (FIG. 1) is then drawn on the bare surface 15 just beyond the extent of pressure sensitive adhesive 12. The bead is drawn for a length approximately the same as a width of the optical fiber ribbon with skin to be removed. Then the span of optical fiber ribbon 19 with the skin to be removed is positioned on the panel 11 so that the desired starting point 22 mates with the bead of strong liquid adhesive 21 and the desired stopping point 24 is in the direction aligned with the length of panel toward the pressure sensitive adhesive 12, i.e., away from the base surface 15.

With the target span of optical fiber ribbon 19 thus oriented and positioned, pressure is manually exerted along the exposed surface of the optical fiber ribbon 16 from the bead of strong liquid adhesive 21 to the far end of the panel segment, all along the length covered with the pressure sensitive adhesive 12.

After about five seconds the bead 21 of strong liquid adhesive will usually have dried, so the resin skin 18 can be started tearing where it is bonded to the bare surface 15 by the strong liquid adhesive 21. To do this, the ribbon 16 is gripped near the desired starting point but away from the rest of the panel segment, and is pulled generally up, so that the skin 18 tears along the intended tear line 23, starting at the starting point 22.

In one embodiment, while pulling back the skin along the tear line 23, a roller 26 is used to guarantee a minimum bend radius of approximately 1½ inches, which avoids causing attenuation of the signals in any of the fibers 17 (FIG. 2) that may be signal-bearing during the mid-span access, and avoids causing stresses in the ribbon 16 that may cause immediate or delayed fracture. The roller 26 is usually approximately 1/12 of an inch long, although longer or shorter lengths may be used. Perferably, the roller 26 has a length in the range from ½ inch to 1 inch. The roller 26 is placed on the ribbon 16 after is has been glued to the panel 11. It is placed just on top of the point of the ribbon 16 where the skin 18 is tearing. As the ribbon is pulled back, it causes the roller 26 to roll along the top of the ribbon 16 so as to remain on top of the point of the ribbon 16 where the skin is tearing, as the point moves from one end of the panel 11 to the other.

If the desired stopping point 24 is beyond the end of the length of the panel 11, the skin that was removed and is adhered to the pressure sensitive adhesive 12 can be broken off; the pressure sensitive adhesive 12 on a new panel : segment can be exposed by peeling off the silicone paper 13 (FIG. 1) up to the next perforation 14 (FIG. 1); and the unfinished ribbon can be moved over to the newly exposed pressure sensitive adhesive 12 so that the tearing process can continue, until the desired stopping point 24 is reached. There is no need, usually, to reapply the strong liquid adhesive 21 in continuing to remove the skin 18, since the tear line 23 on the skin 18 will have already been started, even after the skin 18 on the pressure sensitive adhesive 12 is broken off.

Once all the skin 18 on one side is removed, the ribbon 16 can be turned over, and the process repeated for the skin 18 on the other side using a new area of the panel, with fresh pressure-sensitive adhesive 12. Sometimes it will be possible to remove the skin 18 on the second side without placing it on the panel. For example, the skin 18 on the second side might separate easily from the optical fiber 17 and can be cut with almost any kind of scissors4ike tool.

After removing the desired resin skin, used-up panels and silicone paper can be collected and discarded appropriately.

It is apparent from what has been described, that this method works as long as there is at least one end of the span from which the skin is to be removed that is far enough way from an end of the fiber that the fiber can be gripped and pulled as described. Thus, this method is of use in the case of either both the desired starting and stopping points being away from the end of a ribbon, or either one of those points being at the end of a ribbon with the other far enough away from an end to allow gripping by a human hand.

It is also apparent that this method can be altered slightly to work with solid, not perforated, silicone paper; solid silicone paper can be scored or cut to control how it peels off. Preferably, the solid silicone paper forms a removal covering which can be scored about ½ inch from its width edge for the entire length of the panel. This scoring forms an about ½ inch wide section which can then be removed. Moreover, it is apparent that there are other, equivalent materials that can be used to cover and preserve the pressuresensitive adhesive prior to its being used. The only requirement for a material to play the role of the silicone paper is that it adhere to the part of a panel covered with pressure-sensitive adhesive firmly enough not to loosen under normal handling, and that it can be peeled off of the panel in one piece.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

Having now disclosed the invention, what is claimed is:

1. A method of freeing optical fibers enclosed within an outer protective skin of an optical fiber ribbon, starting from a desired point of entry and ending at a desired terminating point, comprising the steps of:

a) providing an elongated rubber panel having a surface with a portion covered by a pressure sensitive adhesive coating and another bare area portion that has an at least partially cured bead of liquid adhesive thereon, and further providing an optical fiber ribbon held on the elongated rubber panel by the at least partially cured liquid adhesive and the pressure sensitive adhesive coating, the optical fiber ribbon having a plurality of optical fibers in an outer protective skin; and b) moving the optical fiber ribbon relative to the elongated rubber panel until the outer protective skin of the optical fiber ribbon splits into two parts, one part adhering to the at least partially cured liquid adhesive and to the pressure sensitive adhesive coating.

2. A method as claimed in claim 1, wherein the pressure sensitive adhesive coating on the elongated rubber panel is covered by a removable covering, and wherein the step of providing the elongated rubber panel further comprises removing at least a portion of the removable covering to allow the optical fiber ribbon to be held on the elongated rubber panel by the pressure sensitive adhesive coating, thereby exposing at least a section of the pressure sensitive adhesive coating.

3. A method as claimed in claim 2, further comprising the steps of:

i) before the step of removing at least a portion of the removable covering, gripping the elongated rubber panel;

ii) after the step of removing at least a portion of the removable covering, drawing the bead of liquid adhesive across a width of the bare area portion of the elongated rubber panel and adjacent to the exposed section of the pressure sensitive adhesive coating for a length approximately the same as a width of the optical fiber ribbon;

iii) laying the optical fiber ribbon along the length of the elongated rubber panel so that the desired point of entry is placed on the bead of liquid adhesive and the desired terminating point is in a direction, relative to the bead of liquid adhesive, toward the pressure sensitive adhesive coating, whereby some of the optical fiber ribbon with skin to be removed rests on the pressure sensitive adhesive coating;

iv) manually applying pressure on the optical fiber ribbon lying on the elongated rubber panel, thereby urging the optical fiber ribbon onto both the pressure sensitive adhesive coating and the bead of liquid adhesive;

v) gripping the optical fiber ribbon at a gripping position along a part of the optical fiber ribbon that is, relative to the bead of liquid adhesive, opposite from the desired terminating point;

vi) in the step of moving the optical fiber ribbon relative to the elongated rubber panel, pulling on the optical fiber ribbon from the gripping position up and away from the panel and generally toward the desired terminating point until the skin of the optical fiber ribbon splits into two parts, one part adhering to the pressure sensitive adhesive coating, and another part, still partially grasping the optical fibers to be freed, pulling away from the one part;

vii) continuing to pull on the optical fiber ribbon until either the skin separates all the way to the desired terminating point, or the skin separates all the way to a location where the optical fiber ribbon overruns an end of the panel; and viii) if the desired terminating point lies beyond the end of the panel, resetting the optical fiber ribbon on the panel by lifting the optical fiber ribbon away from the panel and laying the optical fiber ribbon back on the panel so that the point reached in step vii is laid adjacent where the bead of liquid adhesive was drawn and the desired terminating point is in the direction of said pressure sensitive adhesive coating, and repeating steps beginning with step iv;

wherein the panel is made of a material selected from a group consisting of neoprene and nitrile.

4. A method as claimed in claim 2, wherein the removable covering is silicone paper.

5. A method as claimed in claim 2, wherein the step of removing the removable covering includes scoring the removable covering and removing at least the portion of the removable covering adjacent the pressure sensitive adhesive coating on which the optical fiber ribbon is to be placed.

6. A method as claimed in claim 2, wherein the removable covering is perforated as a guide in removing a portion of the removable covering each time more of the pressure sensitive adhesive coating is exposed.

7. A method as claimed in claim 1, wherein the liquid adhesive includes cyanoacrylate.

8. A method as claimed in claim 1, further including the steps of, prior to moving the optical fiber ribbon relative to the elongated rubber panel, placing a roller having a selected diameter near the bead of liquid adhesive on top of the optical fiber ribbon lying on the elongated rubber panel and guiding the roller along the top of the optical fiber ribbon during the step of moving the optical fiber ribbon relative to the elongated rubber panel, thereby maintaining a minimum bend radius of the optical fiber ribbon equal to the diameter of the roller.

9. A method as claimed in claim 8 wherein the roller has an approximately 3-inch diameter and an approximately ½-inch to 1-inch length.

10. A method as claimed in claim 1, further comprising the steps of continuing to move the optical fiber ribbon relative to the elongated rubber panel until either the outer protective skin separates all the way to the desired terminating point, or the outer protective skin separates all the way to a location where the optical fiber ribbon overruns an end of the elongated rubber panel, and, if the desired terminating point lies beyond the end of the elongated rubber panel, repeating the steps beginning with the step of providing the elongated rubber panel.

11. A method as claimed in claim 1, wherein the elongated rubber panel is made from a material selected from the group consisting of neoprene and nitrile.

12. A kit for freeing optical fibers enclosed within an outer protective skin of an optical fiber ribbon, starting from a desired point of entry and ending at a desired terminating point, comprising:

a) an elongated rubber panel having a broad side, the broad side having a surface with a portion covered by a pressure sensitive adhesive coating and a bare area portion for receiving a bead of liquid adhesive; and b) a supply of liquid adhesive for providing the bead of liquid adhesive on the bare area portion.

13. A kit as claimed in claim 12, wherein the liquid adhesive includes cyanoacrylate.

14. A kit as claimed in claim 1, wherein the pressure sensitive adhesive coating on the elongated rubber panel is covered by a removable covering.

15. A kit as claimed in claim 14, wherein the removable covering is silicone paper.

16. A kit as claimed in claim 15, wherein the panel is made from a material selected from the group consisting of neoprene and nitrile, and wherein the pressure sensitive adhesive coating coats a broad side of the elongated rubber panel.

17. A kit as claimed in claim 14, wherein the removable covering is perforated.

18. A kit as claimed in claim 12, further comprising a roller for maintaining a minimum bend radius of the optical fiber ribbon while freeing the optical fibers from the outer protective skin.

19. A kit as claimed in claim 18, wherein the roller has an approximately 3-inch diameter and an approximately ½-inch to 1-inch length.

20. A kit as claimed in claim 12, wherein the elongated rubber panel is made from a material selected from the group consisting of neoprene and nitrile.

* * * * *